(12) United States Patent
Pantaleo et al.

(10) Patent No.: US 9,706,557 B2
(45) Date of Patent: Jul. 11, 2017

(54) SIGNALING OF MGW IDENTIFY IN SIP-I

(71) Applicant: TELEFONAKTIEBOLAGET L M ERICSSON (PUBL), Stockholm (SE)

(72) Inventors: Marcello Pantaleo, Aachen (DE); John Kerr, Airdrie (GB); Philips Hodges, Frimley (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/710,900

(22) Filed: May 13, 2015

(65) Prior Publication Data

US 2015/0249994 A1 Sep. 3, 2015

Related U.S. Application Data

(63) Continuation of application No. 12/738,912, filed as application No. PCT/IB2008/002837 on Oct. 23, 2008, now abandoned.

(60) Provisional application No. 60/982,880, filed on Oct. 26, 2007.

(51) Int. Cl.
*H04W 72/08* (2009.01)
*H04L 29/06* (2006.01)
*H04L 29/08* (2006.01)
*H04W 80/10* (2009.01)

(52) U.S. Cl.
CPC ........... *H04W 72/08* (2013.01); *H04L 65/103* (2013.01); *H04L 65/1006* (2013.01); *H04L 65/1023* (2013.01); *H04L 65/1069* (2013.01); *H04L 67/141* (2013.01); *H04W 80/10* (2013.01)

(58) Field of Classification Search
None
See application file for complete search history.

(56) References Cited

U.S. PATENT DOCUMENTS

| | | | |
|---|---|---|---|
| 2002/0015391 A1* | 2/2002 | Kriaras | H04M 7/006 370/328 |
| 2005/0083844 A1 | 4/2005 | Zhu et al. | |
| 2006/0039397 A1 | 2/2006 | Hari et al. | |

(Continued)

OTHER PUBLICATIONS

3GPP. 3rd Generation Partnership Project; Technical Specification Group Core Network and Terminals; SIP-I based circuit-switched core network; Stage 2 (Release 8) 3GPP TS 23.231 V0.0.0 (Sep. 2007).

(Continued)

*Primary Examiner* — Angela Nguyen

(57) ABSTRACT

The invention relates to signaling of MGW identity in SIP-I. A Call Control Unit of a network includes an Input/Output unit. The Call Control Unit includes a processing unit in communication with the input/output unit. The Call Control Unit includes a memory unit in communication with the processing unit, the processing unit producing a signal having information which identifies a seized Media Gateway (MGW) related to a call establishment or one or more offered Media Gateways, which is sent via Session Initiation Protocol (SIP) to a Mobile Switching Center (MSC)-Server in the network which is in charge to seize a MGW. A computer readable medium storing a computer program, which, when executed by at least one processing unit, signals a media gateway (MGW) identity. A method in a telecommunications node for signaling a Media Gateway (MGW) Identity.

19 Claims, 7 Drawing Sheets

(56) References Cited

U.S. PATENT DOCUMENTS

| | | | |
|---|---|---|---|
| 2006/0203749 A1 | 9/2006 | Tseng | |
| 2006/0233333 A1* | 10/2006 | Brombal | H04L 65/1006 379/114.2 |
| 2007/0053343 A1* | 3/2007 | Suotula | H04M 7/1285 370/352 |
| 2007/0189268 A1* | 8/2007 | Mitra | H04L 29/06027 370/352 |
| 2007/0286179 A1* | 12/2007 | Freyman | H04M 7/0072 370/356 |

OTHER PUBLICATIONS

International Telecommunication Union. ITU 0.1902.4 Bearer Independent Call Control Protocol. (Jul. 2001).

Garcia-Martin et al., Request for Comments (RFC) 3455, Jan. 2003, p. 3.

LM Ericsson. MGW Selection/Bearer Establishment Models in SIP-I. 3GPP Draft; C4-071421, 3rd Generation Partnership Project (3GPP}, Mobile Competence Centre, 650, Route des Lucioles, F-06921 Sophia-Antipous Cedex, France, vol. CT WG4. No. Kobe: Oct. 8, 2007. Sep. 28, 2007 12007-0B-28). pp. 1-7.

3GPPP Technical Specification Group Gore Network and Terminal; (G)MSC•S-(G)MSC•S Nc Interface based on the SIP-I Protocol: (Release 7). 3GPP Draft; 29802-700, 3rd Generation Partnership Project (3GPP}, Mobile Competence Centre, 650, Route des Lucioles, F-06921 Sophia-Antipous Cedex, France, vol. CT WG3. No. Vienna: Aug. 20, 2007, Jun. 22, 2007 (Jun. 22, 2007), pp. 1-69.

Universal Mobile Telecommunications System (UMTS}: Bearer-independent circuit-switched core network: Stage 2 (3GPP TS 23.205 version 7.6.0 Release 7); ETSI TS 123 205 ETSI Standards, US, Sophia Antipolis Cedex. France, vol. 3-CN4, M. V7 8 0, Oct. 1, 2007 (Oct. 1, 2007). pp. 1-241.

\* cited by examiner

SIGNALING OF MGW IDENTIFY IN SIP-I

RELATED APPLICATIONS

This application is a continuation of co-pending U.S. patent application Ser. No. 12/738,912 filed Apr. 20, 2010, which is a 371 of International Application No. PCT/IB2008/002837, filed Oct. 23, 2008, which claims benefit of U.S. Provisional Application No. 60/982,880, filed Oct. 26, 2007, the disclosures of which are fully incorporated herein by reference.

TECHNICAL FIELD

The invention relates to the field of telecommunication, and more specifically, to a communication system using layered architecture and SIP-I like protocols. (As used herein, references to the "present invention" or "invention" relate to exemplary embodiments and not necessarily to every embodiment encompassed by the appended claims.)

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

With 3GPP Rel'8 there is now the inclusion of SIP-I on the Nc interface, where BICC protocol would be replaced as the call control protocol within PLMN, further reference hereto may be found in 3GPP TS 23.231 and TR 29.802 and ITU Q.1902.4, incorporated by reference herein. Such a system is displayed exemplary in FIG. 1 showing the functional split into a user plane comprising the UTRAN and GERAN with respect to their Interface (A-Interface) towards the MediaGateway (MGW) and among MediaGateways (Nb-Interface) and a signaling plane comprising the UTRAN and GERAN with respect to their Interface (Iu-Interface) towards the Mobile Switching Center Server (MSC-S) and among MSC-Server (MSC-Server, Gateway MSC) with the Nc Interface. As shown, the signaling plane is indicated by a dashed line, whereas the User Plane is indicated by a solid line.

Currently, within a BICC based Public Land Mobile Network (PLMN) as an example of a mobile communications network the media gateway selection procedures enable a node to select a media gateway (MGW) which is most suitable for a given traffic case, thereby offering the operator the ability to optimize user plane resources and also enabling flexible routing of the actual payload.

Although in the following, the problems are explained with respect to a mobile communication network, the same problems may arise in a fixed mobile network.

However, the above networks suffer certain problems which will be explained in the following.

In order to have almost the same level of functionality as currently applied to 3GPP BICC layered architecture, in this case optimized MGW selection, SIP-I needs to offer some means of signaling the identity of MGW(s). The MGW could be identified by using either the sent or received user plane connection's Internet Protocol (IP) address. But this assumes all (G)MSC servers know all IP addresses of every MGW and can thus map this to an actual MGW. This is inefficient and unnecessarily complicates the network configuration. This is somewhat analogous to the handling of the Bearer Control Unit Identifier (BCU-Id) in BICC. When BICC is run over IP, it is the BCU-Id that is used for MGW selection, not the connection IP addresses which are swapped via the IP Bearer Control Protocol (IPBCP).

Currently, the concept of MGW identity (or BCU-Id) is not specified in SIP-I; thereby MGW selection optimization is not possible. Without such indication, each (G)MSC server would need to select and use locally configured MGW(s), without utilizing any network knowledge. Further, from a 3GPP perspective, external networks shall always select their own MGW. Thus the GMSC and interworking MSC servers shall also seize a MGW at the network border. In order to offer MGW at the Edge, call establishment procedures need to allow deferred (for mobile originating) or optimized (for mobile terminating) MGW selection.

Deferred MGW Selection

FIG. 2 explains an example of deferred MGW selection that could be applied to SIP-I. In this case, a Session Description Protocol (SDP) offerer is an originating MSC Server which does not signal any MGW identity.

The SDP answerer is an interworking MSC Server which seizes the MGW at its network border and returns its MGW identity to the originating MSC Server. The originating MSC Server now has the ability to select the same MGW. It seizes a bearer termination, indicating in a new second SDP offer to the interworking MSC Server a user plane connection address without any MGW identity.

Optimised MGW Selection

In FIG. 3 is explained an example of optimized MGW selection that could be applied to SIP-I. In this case, the SDP offerer is a GMSC Server which has seized a MGW at the network border. The initial SDP offer indicates that a MGW is connected by including a MGW identity. The SDP answerer is a terminating MSC Server which is able to connect to the same MGW. It seizes a bearer termination in this MGW and returns in the SDP answer both a user plane connection address and used MGW identity.

MGW Negotiation

Not all MGWs may be controlled by all MSC Servers; if this were the case there would be a heavy burden on the operator to configure the network and there would also be the need for a fully meshed transport and GCP signaling network which might not be the case in a network with large geographical coverage and varying traffic densities across the network. Further, not all MGWs, even if they are controlled by all MSC Servers, may support all the same features; pooling of resources may occur in certain MGWs.

It is therefore desired to be able to signal a recommended set of MGWs that would be suitable for a given call and allow the succeeding node or terminating node to select the most suitable MGW that fulfills the requirements of the given call.

SUMMARY

The present invention pertains to a Call Control Unit of a network. The Call Control Unit comprises an Input/Output unit. The Call Control Unit comprises a processing unit in communication with the input/output unit. The Call Control Unit comprises a memory unit in communication with the processing unit. The processing unit produces a signal having information which identifies a seized Media Gateway (MGW) related to a call establishment or one or more offered Media Gateways related to a call establishment, which is sent via Session Initiation Protocol (SIP) to a Mobile Switching Centre (MSC)-Server in the network which is in charge to seize a MGW.

The present invention pertains to a computer readable medium storing a computer program which when executed by at least one processing unit signals a media gateway (MGW) identity. The computer program comprises instructions for the processing unit generated steps of identifying a seized MGW or one or more offered Media Gateways. There is the step of sending a signal via Session Initiation Protocol (SIP) having information which identifies the seized MGW or one of more of the offered Media Gateways.

The present invention pertains to a method in a telecommunications node for signaling a Media Gateway (MGW) Identity. The method comprises the steps of identifying a seized MGW. There is the step of sending a signal via Session Initiation Protocol (SIP) having information which identifies the seized MGW.

To ensure MGW at the Edge in similar manner to that using a BCU-ID in BICC, three alternatives are given as examples on how to signal either a single or multiple ID(s) for MGW. These alternatives either use or update existing SIP mechanisms of carrying information. Within all of these alternatives, it is not intended to alter or change the technique of deferred or optimized MGW selection. Also the use of single or multiple MGW-Id(s) is considered as being the same from a signaling perspective.

In a first embodiment, a new P-Header is introduced.

This P-Header (Private-Header) Definition is simulated to some extent by P-headers as defined in RFC (Request for Comment) 3455. Within the application, this newly introduced P-header is referred also as "P-MGW-ID".

The new P-Header extension allows a (G)MSC server node to signal the identity of the seized MGW or the identity of one or more offered MGWs for usage within a 3GPP CS domain.

In the following, short examples thereof are presented:
Examples:
P-MGW-ID=no-mgw-selected
P-MGW-ID=mgw1.operator.net, mgw2.operator.net
P-MGW-ID=127.124.65.78
P-MGW-ID=0111000 0101000 1101011 0011011

In a second embodiment an origin line (o=) is used for the purpose within SDP.

This origin parameter is originally defined in SDP according to RFC 4566. However, then the MGW identity should be carried within the <unicast-address> field.

This would allow the (G)MSC server to set the <unicast-address> of the origin ("o=") line to the MGW identity of the seized/offered MGW or to a reserved string indicating that no MGW identity is provided.

In the following short examples thereof are presented:
Examples:
o=–2890844526 2890842807 IN IP4 no-mgw-selected
o=–2890844526 2890842807 IN IP4 mgw1.operator.net
o=–2890844526 2890842807 IN IP4 10.47.16.5

In a third embodiment an attribute line (a=) is used for the purpose within SDP.

Such a new <attribute> is to be registered for use in existing 'session level' attribute ("a=") line in SDP, as defined in RFC 4566.

It could be assigned in the same manner as BCU-ID in BICC; i.e. 4 octets for representing Network ID field and the Local BCU-ID field.

A (G)MSC server node shall include one 'session level' attribute (a=3gMGWid) set to the MGW identity of the seized MGW. Alternatively one or more (a=3gMGWid) attributes for each offered MGW may be offered.

In the following, a short example thereof is presented:
Example:
a=3gMGWid: 0x07 0xA6 0xD2 0x35

BRIEF DESCRIPTION OF THE DRAWINGS

In the accompanying drawings, preferred embodiment of the invention and preferred methods of practicing the invention are illustrated in which.

DETAILED DESCRIPTION

Figure 7:
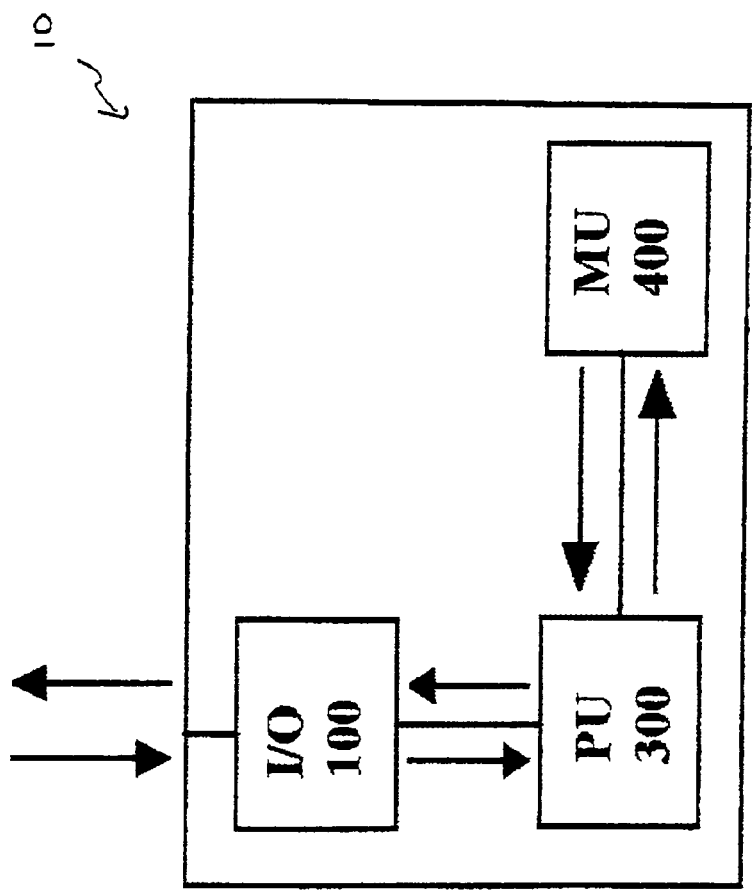
FIG. 7 is a block diagram of a call control unit of the invention.

Referring now to the drawings wherein like reference numerals refer to similar or identical parts throughout the several views, and more specifically to FIG. 7 thereof, there is shown a call control unit 10 of a network. The call control unit 10 comprises an input/output unit 100. The call control unit 10 comprises a processing unit 300 in communication with the input/output unit 100. The call control unit 10 comprises a memory unit 400 in communication with the processing unit 300. The processing unit 300 produces a signal having information which identifies a seized Media Gateway (MGW) related to a call establishment or one or more offered Media Gateways related to a call establishment, which is sent via Session Initiation Protocol (SIP) to a terminating Mobile Switching Centre (MSC)-Server in the network.

Preferably, the information in the signal is contained in an a-Parameter of a Session Description Protocol (SDP) message. The processing unit 300 preferably includes one session level attribute set to an MGW identity of the seized MGW, or one or more session level attributes each one set to an offered MGW within an SDP offer encapsulated in an initial invite request.

Preferably, the processing unit 300 selects the MGW using the session level attribute included within an SDP answer in a first response to the invite request. The processing unit 300 preferably uses a session level a=inactive attribute in the SDP offer included in the initial invite request to indicate a user plane is not connected. Preferably, the MGW identity includes an octet string. The call control unit 10 can be, for example, an MSC server, as more fully described below.

The present invention pertains to a computer readable medium storing a computer program which, when executed by at least one processing unit 300, signals a media gateway (MGW) identity. The computer program comprises instructions for the processing unit 300 generated steps of identifying a seized MGW or one or more offered Media Gateways. There is the step of sending a signal via Session Initiation Protocol (SIP) having information which identifies the seized MGW or one of more of the offered Media Gateways.

Preferably, the sending step includes the step of sending the information contained in an a-Parameter of a Session Description Protocol (SDP) message. There can be the step of including one session level attribute set to an MGW identity of the seized MGW, or one or more session level attributes each one set to an offered MGW within an SDP offer encapsulated in an initial invite request. Preferably, there is the step of selecting the MGW using the session level attribute included within an SDP answer in a first response to the invite request. There is preferably the step of using the session level a=inactive attribute in the SDP offer included in the initial invite request to indicate a user plane is not connected. Preferably, there is the step of seizing the MGW. The MGW identity preferably includes an octet string.

The present invention pertains to a method in a telecommunications node for signaling a Media Gateway (MGW) Identity. The method comprises the steps of identifying a seized MGW. There is the step of sending a signal via Session Initiation Protocol (SIP) having information which identifies the seized MGW.

Preferably, the identifying step includes the step of identifying one or more offered Media Gateways; and the sending step includes the step of sending the signal via SIP having information which identifies one or more of the offered Media Gateways. The sending step preferably includes the step of sending the signal from a call control unit 10. Preferably, there is the step of the call control unit 10 seizing the MGW.

In one embodiment, the sending step can include the step of sending a P-Header with the information. In another embodiment, the sending step can include the step of sending the information contained in an o-Parameter of a Session Description Protocol (SDP) message. In a preferred embodiment, the sending step can include the step of sending the information contained in an a-Parameter of a Session Description Protocol (SDP) message.

Preferably, there is the step of the call control unit 10 including one session level attribute set to an MGW identity of the seized MGW, or one or more session level attributes each one set to an offered MGW within an SDP offer encapsulated in an initial invite request. There is preferably the step of the call control unit 10 selecting the MGW using the session level attribute included within an SDP answer in a first response to the invite request. Preferably, there is the step of using the session level a=inactive attribute in the SDP offer included in the initial invite request by the call control unit 10 to indicate a user plane is not connected. The MGW identity preferably includes an octet string.

As previously indicated, three embodiments to carry MGW-Id(s) are considered; where in the following the (G)MSC server is associated to the use of SIP UAC/UAS (User Agent Client/User Agent Server) terminology. Although the embodiments are addressed separately, there may exist also combinations thereof which might provide further advantages, such as being able to provide MGw list, prioritization of MediaGateways, etc.

With respect to the first embodiment, the behavior of the UAC and the UAS is highlighted in the following.

UAC Behavior:

A (G)MSC server may include a P-MGW-ID header within the initial INVITE request encapsulating an SDP offer. The P-MGW-ID header either includes the identity of the seized MGW or the identity of one or more offered MGWs.

To select a MGW, (G)MSC server may use the MGW identity within a P-MGW-ID header optionally included in the first reliable response that encapsulates the SDP answer.

UAS Behavior:

A (G)MSC server that receives P-MGW-ID header including one or more MGW identities within the initial INVITE request encapsulating an SDP offer may use the P-MGW-ID header to select a local MGW.

A MSC server may include the identity of the locally seized MGW in a P-MGW-ID header within the first reliable response that encapsulates the SDP answer.

Therefore, a corresponding header syntax is proposed:
P-MGW-ID Header Syntax:
P-MGW-ID="P-MGW-ID" HCOLON
  p-mgw-id-spec*(COMMA p-mgw-id-spec)
p-mgw-id-spec=host/mgwid-param
mgwid-param=*OCTET/token

| Table of the new P-MGW-ID header: | | | | | | | |
|---|---|---|---|---|---|---|---|
| Header field | where proxy | ACK | BYE | CAN | INV | OPT | REG |
| P-MGW-ID | R | — | — | — | o | — | — |
| P-MGW-ID | 18x | — | — | — | o | — | — |
| P-MGW-ID | 2xx | — | — | — | o | — | — |
| Header field | SUB | NOT | PRA | INF | UPD | MSG | REF |
| P-MGW-ID | — | — | — | — | — | — | — |

With respect to the second embodiment, using the o=line, the behavior of the UAC and the UAS is highlighted in the following.

The existing origin ("o=") line in SDP is defined in RFC 4566 as:
o=<username><sess-id><sess-version><nettype><addrtype><unicast-address>
where the <unicast-address> is the address of the machine from which the session was created.

For an address type of IP version 4 (IPv4), this is either the fully qualified domain name of the machine or the dotted-decimal representation of the IPv4 address of the machine. For an address type of IP version 6 (IPv6), this is either the fully qualified domain name of the machine or the compressed textual representation of the IPv6 address of the machine. For both IPv4 and IPv6, the fully qualified domain name is the form that SHOULD be given unless this is unavailable, in which case the globally unique address MAY be substituted. It is best not to use a local IP address in any context where the SDP description might leave the scope in which the address is meaningful (for example, a local address MUST NOT be included in an application-level referral that might leave the scope).

UAC Behavior:

A (G)MSC server shall set the <unicast-address> of the origin ("o=") line to the MGW identity of the seized/offered MGW or to reserved string indicating that no MGW identity is provided.

To select a MGW, a (G)MSC server may use <unicast-address> of the origin ("o=") within the SDP answer in the first reliable response to INVITE.

UAS Behavior:

A MSC server may use the <unicast-address> of the origin ("o=") line within the SDP offer encapsulated in the initial INVITE request, to select a MGW.

A MSC server node shall set the <unicast-address> of the origin ("o=") line to either the MGW identity of the seized MGW within the SDP answer of the first reliable response to INVITE.

With respect to the third embodiment, using the a=line, the behavior of the UAC and the UAS is highlighted in the following.

UAC Behavior:

A (G)MSC server shall either include one 'session level' attribute (a=3gMGWid) set to the MGW identity of the seized MGW, or one or more 'session level' attributes (a=3gmgwid) each one set to an offered MGW within the SDP offer encapsulated in the initial INVITE request.

To select a MGW a (G)MSC server may use the 'session level' attribute (a=3gMGWid) optionally included within the SDP answer in the first reliable response to INVITE.

UAS Behavior:

A MSC server that receives one or more 'session level' attributes (a=3gMGWid), may use this parameter to select a MGW.

A MSC server may include one 'session level' attribute (a=3gMGWid) set to the MGW identity of the seized MGW within the SDP answer of the first reliable response to INVITE.

In the following, exemplary signal flows will be explained with respect to the above mentioned embodiments.

The procedures specified below are based on the capability to indicate one or more MGW identities in SIP as for one of the embodiments.

Moreover there is also foreseen the need for the originator of the initial INVITE request to indicate to the receiver of the INVITE whether the user-plane is connected.

For this purpose, the session level a=inactive attribute is used in the SDP offer included in the initial INVITE request. The use of the a=inactive is considered the most appropriate manner to indicate user-plane is connected, though other means may be used.

To offer the possibility for deferred MGW selection, at least the following combinations are possible for the originating MSC server:

1. MGW seized and termination within the MGW seized, where the MGW-ID is included in the initial INVITE. With this case deferred MGW selection is not used. This allows optimised MGW selection i.e. the succeeding node may connect to this MGW.

2. One or more MGW(s) are offered, where the MGW-ID(s) is/are included in the initial INVITE. No user plane bearer Mb termination is seized within the MGW.

Additionally the session level a=inactive in the SDP offer and the connection address in the SDP offer is set to a preconfigured value not associated to a termination in MGW.

3. No MGW is selected or indicated in the initial INVITE, where no user plane bearer Mb-termination is seized. Additionally the session level a=inactive in the SDP offer and the connection address in the SDP offer is set to a preconfigured value not associated to a termination in MGW.

Figure 1:
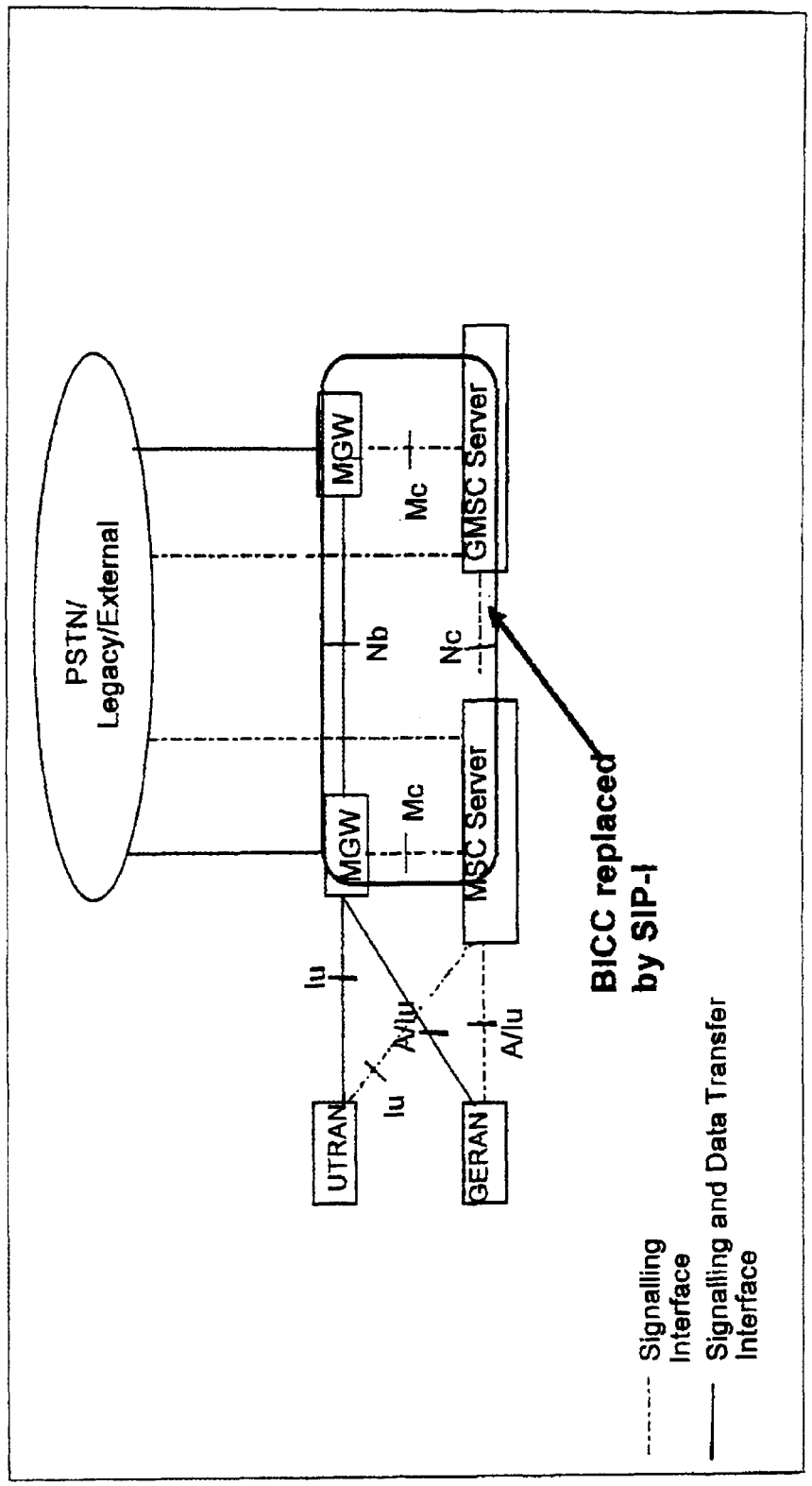
FIG. 1 shows an exemplary 3GPP Layered Architecture.
Figure 2:
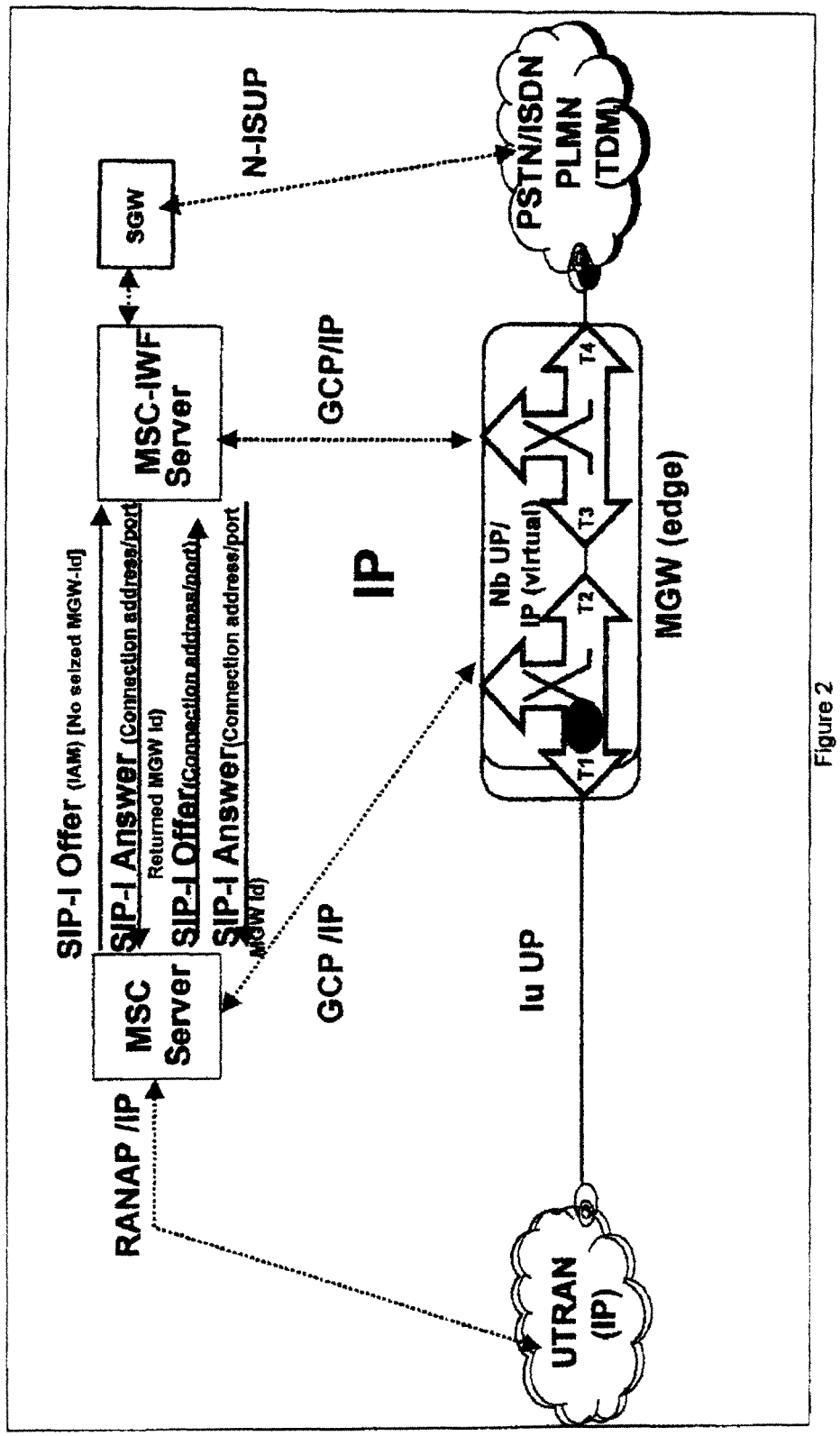
FIG. 2 shows an exemplary deferred MGW Selection.
Figure 3:
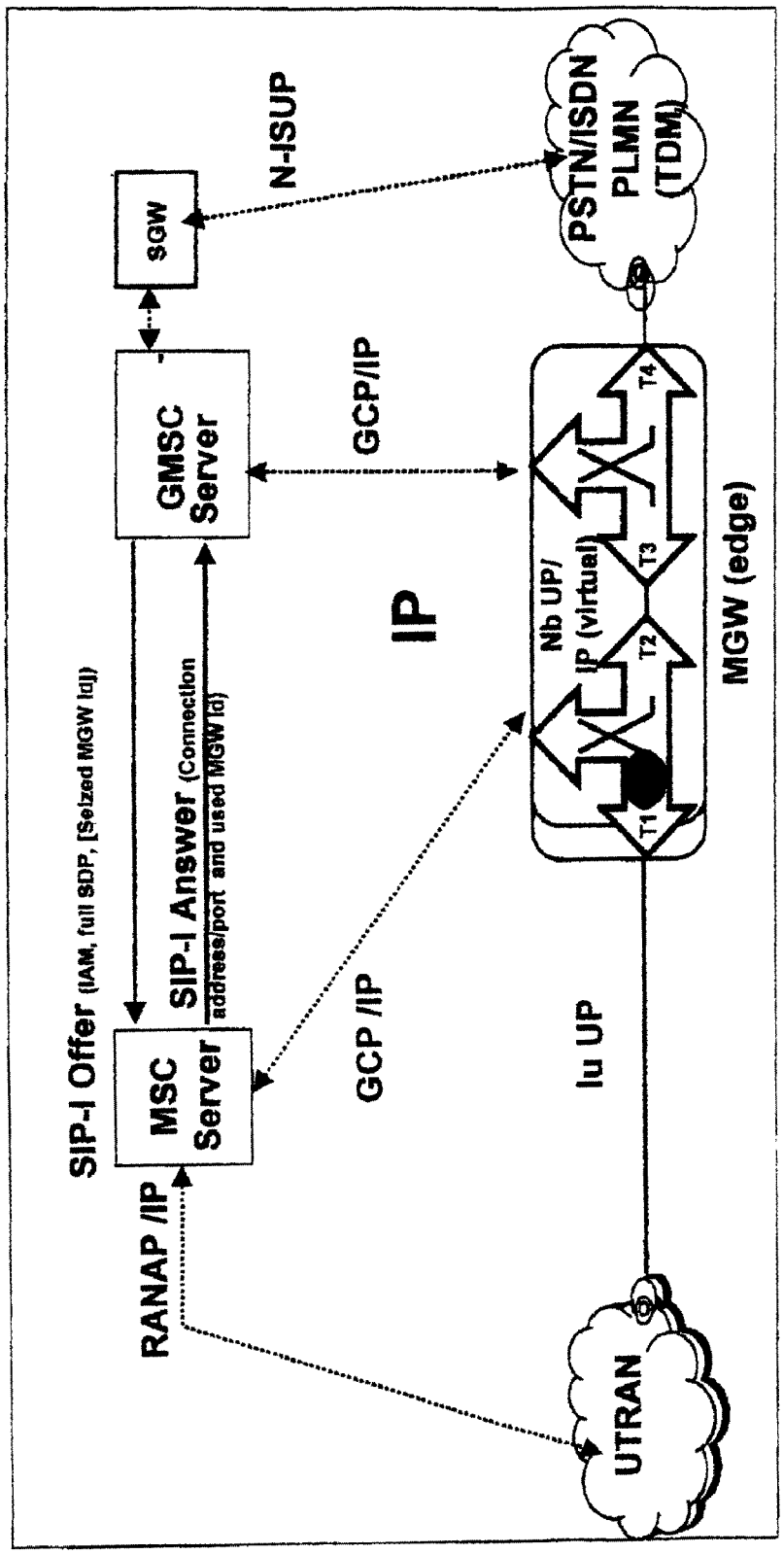
FIG. 3 shows an exemplary optimised MGW Selection.
Figure 4:
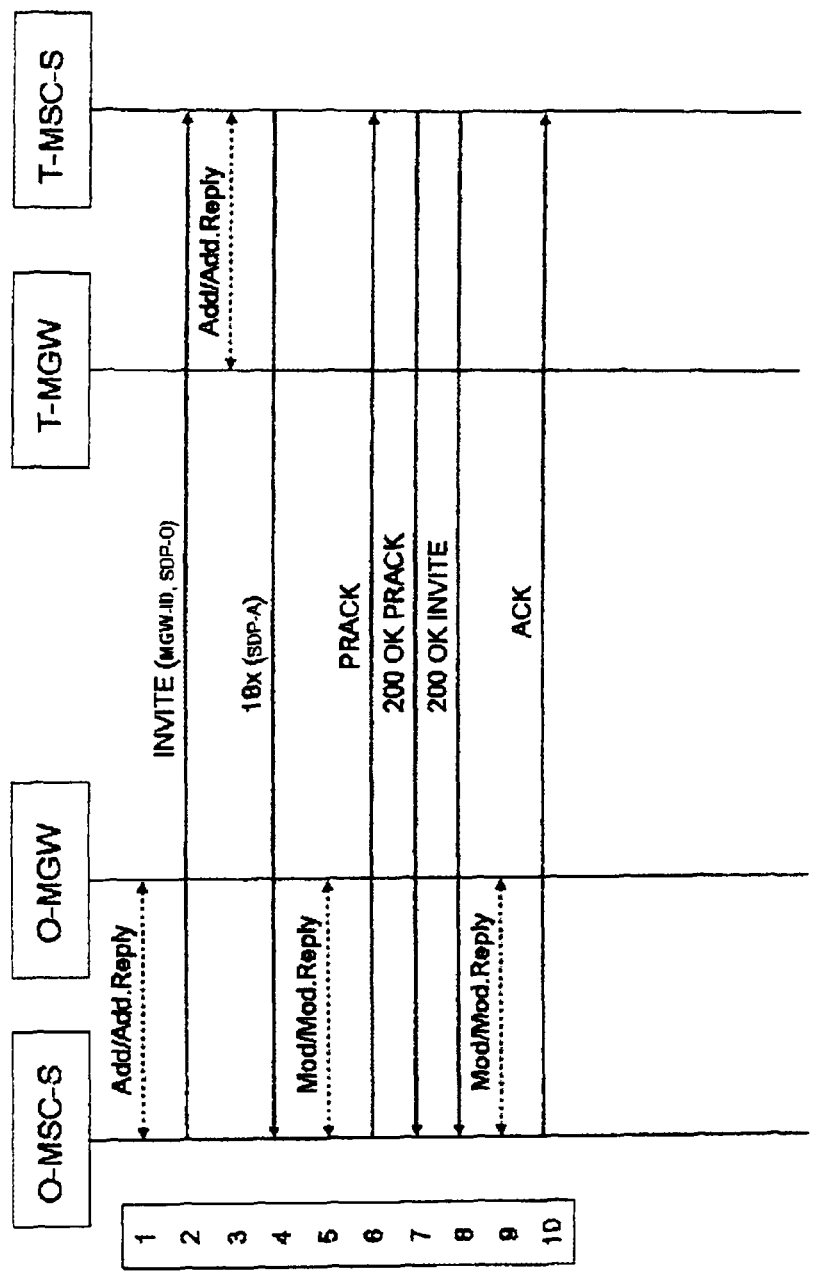
FIG. 4 shows an exemplary signal flow when MGW and user plane bearer termination is seized according to one embodiment of the invention.
Figure 5:
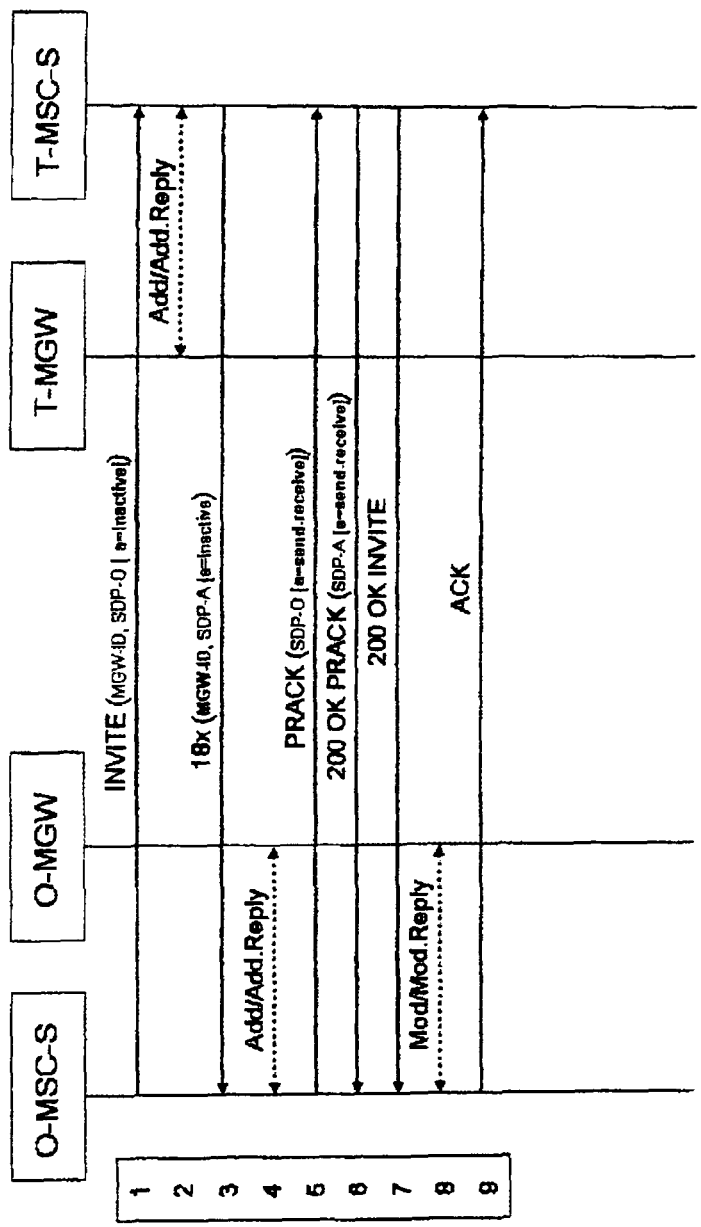
FIG. 5 shows an exemplary signal flow when one or more offered MGW(s) exist according to one embodiment of the invention.
Figure 6:
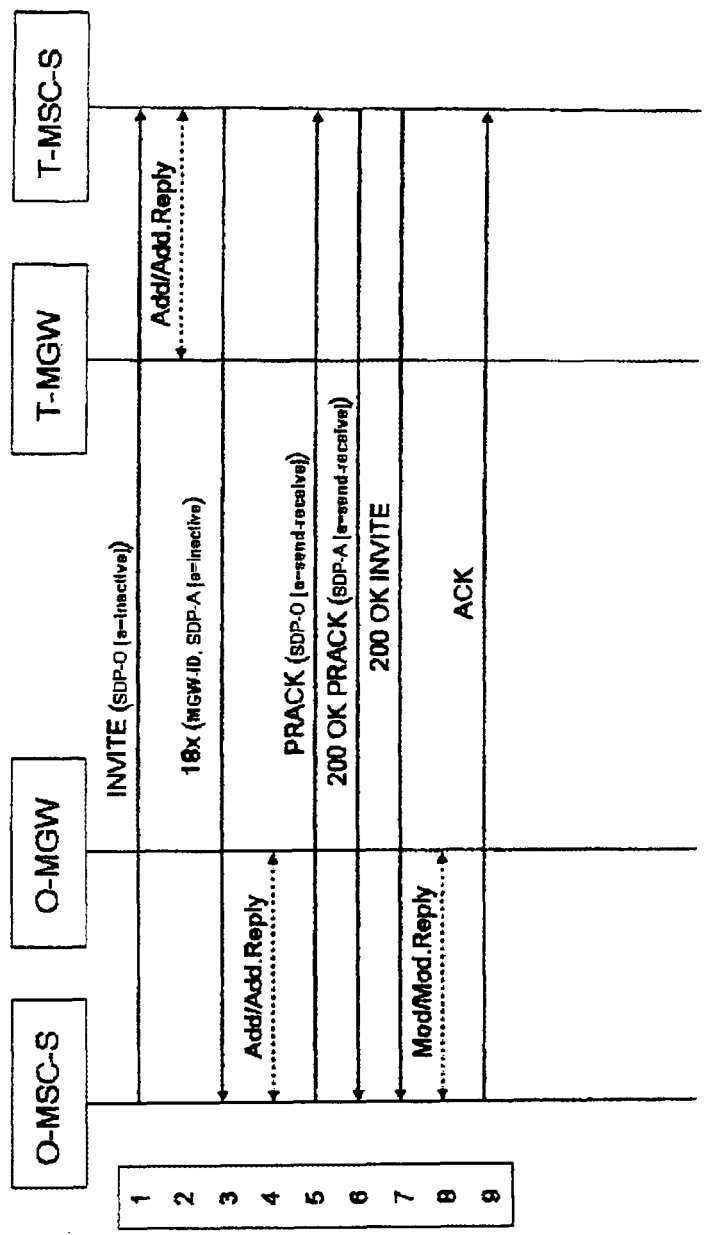
FIG. 6 shows an exemplary signal flow when there is no indication of a selected MGW according to one embodiment of the invention.

These examples for the originating traffic are further shown in the call-flows according to FIGS. 4 to 6, where SIP preconditions are not shown to simplify the signaling.

In the first signal flow shown in FIG. 4, the MGW and User Plane Bearer termination is seized as is explained in further detail.

First, an originating MSC-Server (O-MSC-S) seizes a termination within an originating MediaGateway (O-MGW) in step 1. Thereafter, the O-MSC-S sends in step 2 an INVITE with an SDP Offer and includes the identity of O-MGW. For embodiments 2 and 3 described in this application, the identity of O-MGW will be embedded in the SDP Offer. Then, the Terminating MSC-Server (T-MSC-S) receives the identity of the O-MGW and may use it, in step 3, for selecting an optimal terminating MediaGateway (T-MGW).

Thereafter, and with respect to steps [4]-[10] the signaling continues as per normal SIP session establishment.

In the second signal flow shown in FIG. 5 it is assumed that one or more offered MGW(s) exist and no User Plane Bearer termination is seized.

First, an O-MSC-S does not seize a MGW before sending the INVITE. Instead it includes one or a list of MGW identities in step 1. Since O-MSC-S has not seized a MGW, it indicates that no user plane termination is available for payload setting the a=inactive session attribute. Thereafter, in a second step, a T-MSC-S receives one or a list of MGW identities and from the presence of a=inactive attribute the T-MSC-S understands that O-MSC-S has not seized a MGW. T-MSC-S can use it for selecting an optimal T-MGW. In a third step, due to received a=inactive attribute T-MSC-S returns the identity of T-MGW in the first reliable response containing the SDP answer. This is followed by a fourth step where the O-MSC-S receives the identity of T-MGW and can use it for selecting the same MGW. Now, in a fifth step, the O-MSC-S modifies in step 6 the attribute depending on through-connection handling.

Thereafter, and with respect to steps [7]-[9] the signaling continues as per normal SIP session establishment.

This scenario applies also to the case where O-MSC-S selects a MGW without selecting a termination within the MGW.

In the third signal flow shown in FIG. 6 it is assumed that no indication of a selected MGW is given and that no User Plane Bearer termination is seized.

This signal flow shown in FIG. 6 is similar to the Signal Flow shown in FIG. 5 with the difference that O-MSC-S does not include any MGW identities in INVITE and sets the a=inactive session attribute to inform T-MSC-S that it has not selected a MGW. T-MSC-S will return its selected MGW in order to allow O-MSC-S to select the same MGW.

The above described embodiments offer several advantages which will be described in further detail below.

The techniques described herein offer at least the same functional level for MGW optimization within 3GPP PLMN; as done by BICC today; namely:

1. to indicate in a SIP-I network when signaling a forward direction if a MGW has been selected and identify the selected MGW so that the succeeding node has the possibility to connect to the same MGW;

2. to return the identity of the selected MGW in a SIP-I network when signaling in the backward direction to permit the preceding node to connect to the same MGW.

3. The mechanism to negotiate the optimal MGW for a given call from a list of MGWs; this is a further advantage over what is possible today with BICC or other call control protocols used by a 3GPP PLMN.

4. The mechanism to indicate if the user plane connection is seized at the time of signaling forward the initial offer, thus permitting the sender to defer configuring its associated bearer resources at the time of the offer and configure them when receiving a complete answer with associated bearer termination properties.

Hence, a MSC-S is therefore provided with one or more Input/Output Unit(s) (I/O) 100 as shown exemplary in FIG. 7 for receiving and sending messages towards Media Gateways and other Call Control Nodes such as a terminating MSC-S and with a processing unit (PU) 300 for evaluating SIP messages as defined above. Said means are further arranged for selecting a MediaGateway accordingly. Furthermore, said MSC-S may further comprises a storage unit (MU) 400 for storing values for later-on reuse, e.g. selecting, as defined in the methods above.

An I/O unit (I/O) could be embodied by any kind of Network Interface Card or unit, while the Processing Unit (PU) 300 could be any kind of a processor including a Digital Signal Processor (DSP) or controller or may even be embodied in an ASIC or a FPGA Furthermore, the storage unit (MU) may be embodied in different kind of memory either as a electronic memory such as RAM, EPROM, EEPROM, or storage device such as any kind of optical or magnetic storage medium.

All the methods as presented above may be embodied in hardware, software enabled hardware and software offering the corresponding program logic itself when run on a corresponding programmable device, either in part or as a whole.

ABBREVIATIONS

BCU-ID—Bearer Control Unit Identifier
BICC—Bearer Independent Call Control
GMSC—Gateway Mobile Switching Centre
IPBCP—IP Bearer Control Protocol
MGW—Media Gateway
MSC—Mobile Switching Centre
SDP-A—SDP Answer
SDP-O—SDP Offer
SIP-I—Session Initiation Protocol (ISUP)
UAC—User Agent Client
UAS—User Agent Server Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method in a first Mobile Switching Center Server (MSC-Server) for signaling a Media Gateway (MGW) Identity comprising the steps of:
    identifying a selected MGW; and
    sending a signal via Session Initiation Protocol (SIP) to a second MSC-Server, the signal having information which identifies the selected MGW;
    wherein the information is contained in an a-Parameter of a Session Description Protocol (SDP) message.

2. The method according to claim 1 wherein the identifying step includes the step of identifying one or more offered Media Gateways; and the sending step includes the step of sending the signal via SIP having information which identifies one or more of the offered Media Gateways.

3. The method according to claim 1, including the step of the first MSC-Server including one session level attribute set to an MGW identity of the selected MGW within an SDP offer encapsulated in an initial invite request.

4. The method according to claim 1 wherein the MGW identity includes an octet string.

5. The method according to claim 3 including the step of the first MSC-Server selecting the MGW using the session level attribute included within an SDP answer in a first response to the invite request.

6. The method according to claim 5 including the step of using the session level a=inactive attribute in the SDP offer included in the initial invite request by the first MSC-Server to indicate a user plane is not connected.

7. A first Mobile Switching Center Server (MSC-Server) of a network comprising:
    an Input/Output unit,
    processing circuitry in communication with the input/output unit,
    the processing circuitry configured to produce a signal having information which identifies a selected Media Gateway (MGW) related to a call establishment or one or more offered Media Gateways, which is sent via Session Initiation Protocol (SIP) to a second MSC-Server in the network which is in charge to select a MGW;
    wherein the information is contained in an a-Parameter of a Session Description Protocol (SDP) message.

8. The first MSC-Server according to claim 7, wherein the processing circuitry is further configured to include one session level attribute set to an MGW identity of the selected MGW, or one or more session level attributes each one set to an offered MGW within an SDP offer encapsulated in an initial invite request.

9. The first MSC-Server according to claim 8, wherein the processing circuitry is further configured to select the MGW using the session level attribute included within an SDP answer in a first response to the invite request.

10. The first MSC-Server according to claim 9, wherein the processing circuitry is further configured to use a session level a=inactive attribute in the SDP offer included in the initial invite request to indicate a user plane is not connected.

11. The first MSC-Server according to claim 10, wherein the MGW identity includes an octet string.

12. A non-transitory computer readable medium storing a computer program which when executed by at least one processor in a Mobile Switching Center Server (MSC-Server) signals a media gateway (MGW) identity, the computer program comprising instructions for the processor generated steps of:
    identifying a selected MGW or one or more offered Media Gateways; and
    sending a signal via Session Initiation Protocol (SIP) having information contained in an a-Parameter of a Session Description Protocol (SDP) message, which identifies the selected MGW or one of more of the offered Media Gateways.

13. The non-transitory computer readable medium according to claim 12, including the step of including one session level attribute set to an MGW identity of the selected MGW, or one or more session level attributes each one set to an offered MGW within an SDP offer encapsulated in an initial invite request.

14. The non-transitory computer readable medium according to claim 13, including the step of selecting the MGW using the session level attribute included within an SDP answer in a first response to the invite request.

15. The non-transitory computer readable medium according to claim 14, including the step of using the session level a=inactive attribute in the SDP offer included in the initial invite request to indicate a user plane is not connected.

16. The non-transitory computer readable medium according to claim 15, including the step of selecting the MGW.

17. The non-transitory computer readable medium according to claim 16, wherein the MGW identity includes an octet string.

18. A method in a first Mobile Switching Center Server (MSC-Server) for signaling a Media Gateway (MGW) Identity comprising the steps of:

identifying one or more offered Media Gateways related to a call establishment, and sending a signal via Session Initiation Protocol (SIP) to a second MSC-Server, the signal having information which identifies one or more of the offered Media Gateways, wherein the information is contained in an a-Parameter of a Session Description Protocol (SDP) message.

19. The method according to claim 18, further comprising the step of a call control unit including one session level attribute set to an MGW identity of a selected MGW, or one or more session level attributes each one set to an offered MGW within an SDP offer encapsulated in an initial invite request.

\* \* \* \* \*

UNITED STATES PATENT AND TRADEMARK OFFICE
CERTIFICATE OF CORRECTION

PATENT NO. : 9,706,557 B2
APPLICATION NO. : 14/710900
DATED : July 11, 2017
INVENTOR(S) : Pantaleo et al.

Page 1 of 2

It is certified that error appears in the above-identified patent and that said Letters Patent is hereby corrected as shown below:

On the Title Page

In Item (72), under "Inventors", in Column 1, Line 2, delete "Philips Hodges," and insert -- Philip Hodges, --, therefor.

On Page 2, in Item (56), under "OTHER PUBLICATIONS", in Column 1, Line 7, delete "(3GPP}," and insert -- (3GPP), --, therefor.

On Page 2, in Item (56), under "OTHER PUBLICATIONS", in Column 1, Line 8, delete "Antipous" and insert -- Antipolis --, therefor.

On Page 2, in Item (56), under "OTHER PUBLICATIONS", in Column 1, Line 10, delete "Gore" and insert -- Core --, therefor.

On Page 2, in Item (56), under "OTHER PUBLICATIONS", in Column 1, Line 13, delete "(3GPP}," and insert -- (3GPP), --, therefor.

On Page 2, in Item (56), under "OTHER PUBLICATIONS", in Column 1, Line 14, delete "Antipous" and insert -- Antipolis --, therefor.

On Page 2, in Item (56), under "OTHER PUBLICATIONS", in Column 1, Line 16, delete "(UMTS}:" and insert -- (UMTS): --, therefor.

On Page 2, in Item (56), under "OTHER PUBLICATIONS", in Column 1, Line 19, delete "Cedex." and insert -- Cedex, --, therefor.

In the Drawings

In Fig. 5, Sheet 5 of 7, delete "[a=inactive)" and insert -- [a=inactive]) --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,706,557 B2

In Fig. 6, Sheet 6 of 7, delete "[a=inactive)" and insert -- [a=inactive]) --, therefor.

In the Specification

In Column 1, Line 6, delete "2010," and insert -- 2010, now abandoned, --, therefor.

In Column 2, Line 12, delete "GMSC" and insert -- (G)MSC --, therefor.

In Column 2, Line 33, delete "GMSC" and insert -- (G)MSC --, therefor.

In Column 3, Line 11, delete "one of more" and insert -- one or more --, therefor.

In Column 4, Line 66, delete "one of more" and insert -- one or more --, therefor.

In Column 5, Line 35, delete "o-Parameter" and insert -- a-Parameter --, therefor.

In Column 5, Line 58, delete "MGw" and insert -- MGW --, therefor.

In Column 8, Line 47, delete "MGW;" and insert -- MGW. --, therefor.

In Column 9, Line 10, delete "a electronic" and insert -- an electronic --, therefor.

In Column 9, Line 23, delete "GMSC" and insert -- (G)MSC --, therefor.

In the Claims

In Column 10, Line 43, in Claim 12, delete "one of more" and insert -- one or more --, therefor.